US012647975B2

(12) United States Patent
Matsumura et al.

(10) Patent No.: US 12,647,975 B2
(45) Date of Patent: Jun. 2, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 312 days.

(21) Appl. No.: 18/556,789

(22) PCT Filed: Apr. 23, 2021

(86) PCT No.: PCT/JP2021/016544
§ 371 (c)(1),
(2) Date: Oct. 23, 2023

(87) PCT Pub. No.: WO2022/224457
PCT Pub. Date: Oct. 27, 2022

(65) Prior Publication Data
US 2024/0244614 A1     Jul. 18, 2024

(51) Int. Cl.
*H04W 72/1268* (2023.01)
*H04L 5/00* (2006.01)
*H04W 8/24* (2009.01)
*H04W 16/28* (2009.01)
*H04W 72/04* (2023.01)
*H04W 72/51* (2023.01)

(52) U.S. Cl.
CPC ....... *H04W 72/1268* (2013.01); *H04L 5/0023* (2013.01); *H04L 5/0051* (2013.01); *H04W 8/24* (2013.01); *H04W 16/28* (2013.01); *H04W 72/04* (2013.01); *H04W 72/51* (2023.01)

(58) Field of Classification Search
CPC ....... H04W 16/28; H04W 8/24; H04W 72/51; H04W 72/1268; H04W 72/04; H04L 5/0023; H04L 5/0051
See application file for complete search history.

(56) References Cited

U.S. PATENT DOCUMENTS

2012/0134441 A1     5/2012     Yokomakura et al.
2013/0010716 A1     1/2013     Dinan
(Continued)

FOREIGN PATENT DOCUMENTS

JP     2011-029743 A     2/2011
JP     2020-507965 A     3/2020
WO     2019/130506 A1     7/2019

OTHER PUBLICATIONS

MediaTek Inc., "Codebook based transmission of UL," 3GPP TSG RAN WG1 Meeting NR#3, R1-171785. (Year: 2017).*
(Continued)

*Primary Examiner* — Matthew E Heneghan
(74) *Attorney, Agent, or Firm* — Osha Bergman Watanabe & Burton LLP

(57) ABSTRACT

A terminal according to one aspect of the present disclosure includes a control section that determines a number M of antenna ports and a number N of layers being smaller than M, and a transmitting section that transmits a physical uplink shared channel by using N layers. According to one aspect of the present disclosure, UL transmission of a greater number of layers can be appropriately controlled.

5 Claims, 11 Drawing Sheets

ASSOCIATED WITH SAME TRANSMISSION ANTENNA PORT

(56) References Cited

U.S. PATENT DOCUMENTS

| | | | | |
|---|---|---|---|---|
| 2019/0174527 A1* | 6/2019 | Park | .................. | H04L 5/0046 |
| 2019/0313386 A1* | 10/2019 | Hwang | .............. | H04L 5/0094 |
| 2021/0058274 A1 | 2/2021 | Osawa et al. | | |
| 2021/0099214 A1* | 4/2021 | Ren | .................. | H04W 72/23 |

OTHER PUBLICATIONS

Office Action issued in counterpart Japanese Patent Application No. 2023-516018 mailed on Feb. 4, 2025 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report issued in corresponding International Application No. PCT/JP2021/016544, mailed on Oct. 12, 2021 (5 pages).
Written Opinion issued in corresponding International Application No. PCT/JP2021/016544, mailed on Oct. 12, 2021 (4 pages).
Office Action issued in Japanese Patent Application No. 2023-516018, mailed on Jul. 8, 2025 (6 pages).
MediaTek Inc.; "Codebook Based transmission for UL"; 3GPP TSG RAN WG1 Meeting NR#3, R1-1716785; Nagoya, Japan; Sep. 18-21, 2017 (24 pages).
Office Action issued in Japanese Patent Application No. 2023-516018, mailed on Nov. 4, 2025 (6 pages).

* cited by examiner

FIG. 1B

| NUMBER OF TRANSMISSION ANTENNA PORTS | MAXIMUM NUMBER N OF SUPPORTED LAYERS/RANKS |
|---|---|
| 1 | NOT CONFIGURED (1) |
| 2 | NOT CONFIGURED (2) |
| 4 | NOT CONFIGURED (4) |
| 8 | 6 |

FIG. 1A

| NUMBER M OF TRANSMISSION ANTENNA PORTS | NUMBER N OF SUPPORTED LAYERS/RANKS |
|---|---|
| 1 | 1 |
| 2 | 1,2 |
| 4 | 1,2,3,4 |
| 8 | 1,2,3,4,5,6 |

| INDEX | TRANSMISSION ANTENNA PORT |
|---|---|
| 0 | #0,#1,#2,#3,#4,#5 |
| 1 | #1,#2,#3,#4,#5,#6 |
| 2 | #2,#3,#4,#5,#6,#7 |
| 3 | #0,#1,#2,#5,#6,#7 |

SRS#1    SRS#2    SRS#3    SRS#4    PUSCH

TIME

ASSOCIATED WITH SAME TRANSMISSION ANTENNA PORT

| Value | Number of DMRS CDM group(s) without data | DMRS port(s) | Number of front-load symbols |
|---|---|---|---|
| 0 | 2 | 0-4 | 2 |
| 1 | 2 | 0,1,2,3, 6 | 2 |
| 2 | 2 | 0,1,2,4,5 | 2 |
| 3 | 2 | 0,2,3,6,7 | 2 |
| 4-15 | Reserved | Reserved | Reserved |

FIG. 5B

| Value | Number of DMRS CDM group(s) without data | DMRS port(s) | Number of front-load symbols |
|---|---|---|---|
| 0 | 2 | 0-5 | 2 |
| 1 | 2 | 0,1,2,3,6,7 | 2 |
| 2 | 2 | 0,1,2,3,4,6 | 2 |
| 3-15 | Reserved | Reserved | Reserved |

FIG. 5C

| Value | Number of DMRS CDM group(s) without data | DMRS port(s) | Number of front-load symbols |
|---|---|---|---|
| 0 | 2 | 0-6 | 2 |
| 1 | 2 | 0,1,2,3, 4,6,7 | 2 |
| 2-15 | Reserved | Reserved | Reserved |

FIG. 5D

| Value | Number of DMRS CDM group(s) without data | DMRS port(s) | Number of front-load symbols |
|---|---|---|---|
| 0 | 2 | 0-7 | 2 |
| 1-15 | Reserved | Reserved | Reserved |

FIG. 6A

| Value | Number of DMRS CDM group(s) without data | DMRS port(s) |
|---|---|---|
| 0 | 3 | 0-4 |
| 2-15 | Reserved | Reserved |

FIG. 6B

| Value | Number of DMRS CDM group(s) without data | DMRS port(s) |
|---|---|---|
| 0 | 3 | 0-5 |
| 2-15 | Reserved | Reserved |

FIG. 7A

| Value | Number of DMRS CDM group(s) without data | DMRS port(s) | Number of front-load symbols |
|---|---|---|---|
| 0 | 3 | 0,1,2,3,6 | 2 |
| 1 | 3 | 0,1,2,3,8 | 2 |
| 2 | 3 | 0-4 | 1 |
| 3-31 | Reserved | Reserved | Reserved |

FIG. 7B

| Value | Number of DMRS CDM group(s) without data | DMRS port(s) | Number of front-load symbols |
|---|---|---|---|
| 0 | 3 | 0-5 | 1 |
| 1 | 3 | 0,1,2,3,6,7 | 2 |
| 2 | 3 | 0,1,2,3,8,9 | 2 |
| 3 | 3 | 0,1,2,3,6,8 | 2 |
| 4-31 | Reserved | Reserved | Reserved |

FIG. 7C

| Value | Number of DMRS CDM group(s) without data | DMRS port(s) | Number of front-load symbols |
|---|---|---|---|
| 0 | 3 | 0,1,2,3,6,7,8 | 2 |
| 1 | 3 | 0,1,2,3,6,8,9 | 2 |
| 2 | 3 | 0,1,2,3,4,5,8 | 2 |
| 3-31 | Reserved | Reserved | Reserved |

FIG. 7D

| Value | Number of DMRS CDM group(s) without data | DMRS port(s) | Number of front-load symbols |
|---|---|---|---|
| 0 | 3 | 0,1,2,3,4,5,8,9 | 2 |
| 1 | 3 | 0,1,2,3,6,7,8,9 | 2 |
| 2 | 3 | 0,1,2,3,4,5,6,8 | 2 |
| 3-31 | Reserved | Reserved | Reserved |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing radio communication systems (for example, Rel-15 NR), uplink (UL) Multi Input Multi Output (MIMO) transmission of up to four layers is supported. Regarding future radio communication systems, in order to implement higher spectral efficiency, supporting UL transmission of a greater number of layers has been under study.

However, regarding UL transmission of a greater number of layers, full studies have not yet been carried out on how a network recognizes an antenna configuration of a UE and how the UE is made to perform the UL transmission. Unless this control is clarified, increase of communication throughput may be prevented.

In view of this, the present disclosure has one object to provide a terminal, a radio communication method, and a base station that can appropriately control UL transmission of a greater number of layers.

Solution to Problem

A terminal according to one aspect of the present disclosure includes a control section that determines a number M of antenna ports and a number N of layers being smaller than M, and a transmitting section that transmits a physical uplink shared channel by using N layers.

Advantageous Effects of Invention

According to one aspect of the present disclosure, UL transmission of a greater number of layers can be appropriately controlled.

BRIEF DESCRIPTION OF DRAWINGS

FIGS. 1A and 1B are diagrams to illustrate examples of limitation of the number of layers/ranks.

FIGS. 4A and 4B are diagrams to illustrate examples of UE capability information related to antenna coherency according to a first embodiment.

FIGS. 5A to 5D are diagrams to illustrate examples of tables of antenna ports to be referred to in a case in which a transform precoder is disabled, DMRS type=1, and DMRS maximum length=2 according to a fourth embodiment.

FIGS. 6A and 6B are diagrams to illustrate examples of tables of antenna ports to be referred to in a case in which the transform precoder is disabled, DMRS type=2, and DMRS maximum length=1 according to the fourth embodiment.

FIGS. 7A to 7D are diagrams to illustrate examples of tables of antenna ports to be referred to in a case in which the transform precoder is disabled, DMRS type=2, and DMRS maximum length=2 according to the fourth embodiment.

Figures 2A, 2B:
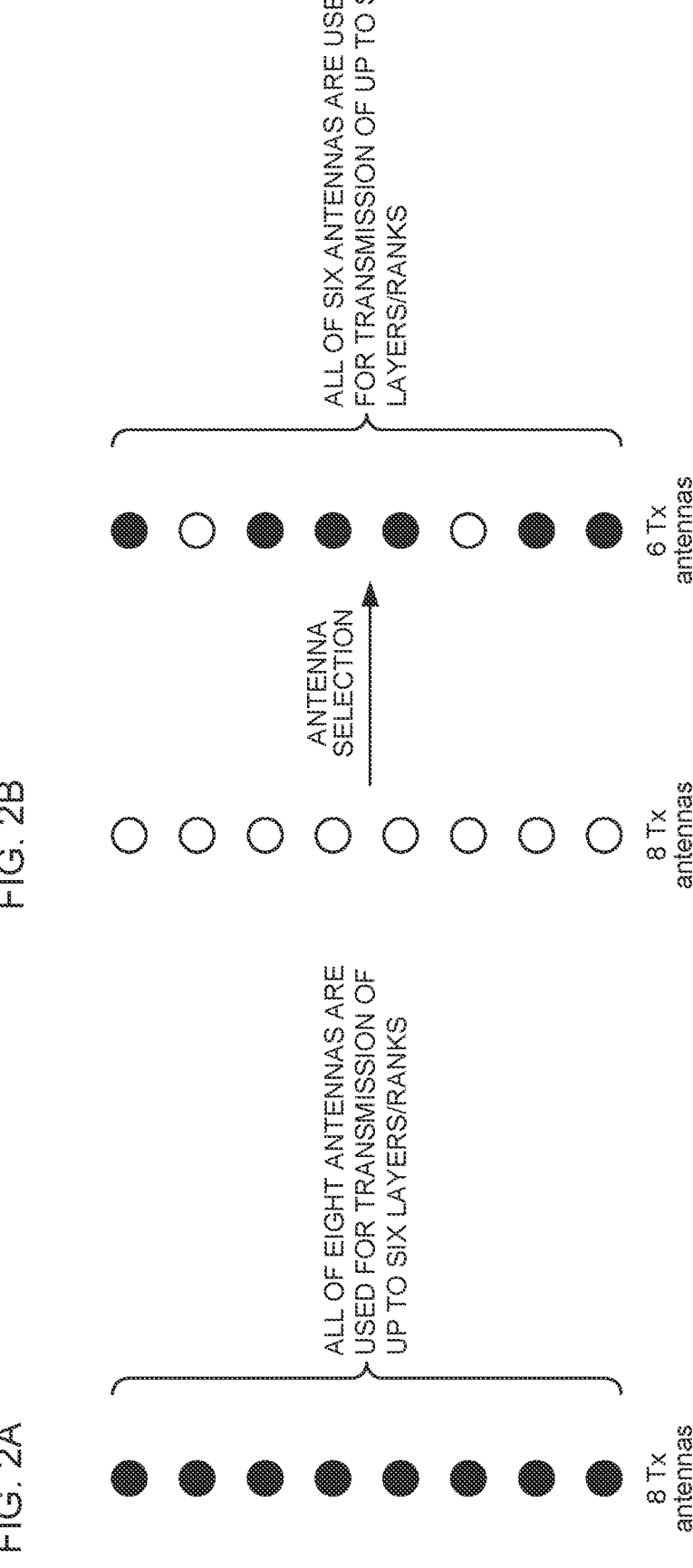
FIGS. 2A and 2B are diagrams to illustrate examples of transmission antenna use methods.

DESCRIPTION OF EMBODIMENTS (Control of Transmission of SRS and PUSCH)

In Rel-15 NR, a UE may receive information (SRS configuration information, for example, a parameter in an RRC control element "SRS-Config") used for transmission of a reference signal for measurement (for example, a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to one or more SRS resources (one or more SRS resources may be grouped together). Each SRS resource may be identified by an SRS resource indicator (SRI) or an SRS resource ID (Identifier).

The SRS resource set information may include information of an SRS resource set ID (SRS-ResourceSetId), a list of SRS resource IDs (SRS-ResourceId) used in the resource set, an SRS resource type, and usage of the SRS.

Here, the SRS resource type may indicate any one of a periodic SRS (P-SRS), a semi-persistent SRS (SP-SRS), and an aperiodic CSI (Aperiodic SRS (A-SRS)). Note that the UE may periodically (or periodically after activation) transmit the P-SRS and the SP-SRS, and transmit the A-SRS, based on an SRS request of DCI.

The usage (an RRC parameter "usage", an L1 (Layer-1) parameter "SRS-SetUse") may be, for example, beam management (beamManagement), a codebook (CB), a non-codebook (noncodebook (NCB)), antenna switching, or the like. The SRS with the usage of the codebook or the non-codebook may be used for determination of a precoder of codebook-based or non-codebook-based uplink shared channel (Physical Uplink Shared Channel (PUSCH)) transmission based on the SRI.

For example, in a case of codebook-based transmission, the UE may determine the precoder for PUSCH transmission, based on the SRI, a transmitted rank indicator (TRI), and a transmitted precoding matrix indicator (TPMI). In a case of non-codebook-based transmission, the UE may determine the precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, periodicity of resources, the number of repetitions, the number of SRS symbols, an SRS bandwidth, or the like), hopping related information, an SRS resource type, a sequence ID, spatial relation information of the SRS, or the like.

The spatial relation information (for example, an RRC information element "spatialRelationInfo") of the SRS may indicate spatial relation information between the reference signal and the SRS. The reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID as an index of the reference signal.

Note that, in the present disclosure, an SSB index, an SSB resource ID, and an SSB Resource Indicator (SSBRI) may be interchangeably interpreted. A CSI-RS index, a CSI-RS resource ID, and a CSI-RS Resource Indicator (CRI) may be interchangeably interpreted. An SRS index, an SRS resource ID, and an SRI may be interchangeably interpreted.

The spatial relation information of the SRS may include a serving cell index, a BWP index (BWP ID), or the like corresponding to the reference signal.

Regarding an SRS resource, when the UE is configured with the spatial relation information related to the SSB or the CSI-RS and the SRS, the UE may transmit the SRS resource by using a spatial domain filter (spatial domain transmission filter) the same as a spatial domain filter (spatial domain reception filter) for reception of the SSB or the CSI-RS. In this case, the UE may assume that a UE receive beam of the SSB or the CSI-RS and a UE transmit beam of the SRS are the same.

Regarding an SRS (target SRS) resource, when the UE is configured with the spatial relation information related to another SRS (reference SRS) and the SRS (target SRS), the UE may transmit the target SRS resource by using a spatial domain filter (spatial domain transmission filter) the same as a spatial domain filter (spatial domain transmission filter) for transmission of the reference SRS. In other words, in this case, the UE may assume that a UE transmit beam of the reference SRS and a UE transmit beam of the target SRS are the same.

Based on a value of a field (for example, an SRS resource indicator (SRI) field) in DCI (for example, DCI format 0_1), the UE may determine spatial relation of the PUSCH scheduled by the DCI. Specifically, the UE may use, for PUSCH transmission, the spatial relation information (for example, the RRC information element "spatialRelation-Info") of the SRS resource determined based on a value (for example, the SRI) of the field.

In Rel-15/16 NR, when codebook-based transmission is used for the PUSCH, the UE may be configured with the SRS resource set having a maximum of two SRS resources with its usage being the codebook by RRC, and one of the maximum of two SRS resources may be indicated by DCI (the SRI field of 1 bit). A transmit beam of the PUSCH is indicated by the SRI field.

The UE may determine the TPMI and the number of layers (transmission rank) for the PUSCH, based on a precoding information and number of layers field (hereinafter also referred to as precoding information field). The UE may select the precoder from an uplink codebook regarding the same number of ports as the number of SRS ports indicated by a higher layer parameter "nrofSRS-Ports" configured for the SRS resources indicated by the SRI field, based on the TPMI, the number of layers, or the like.

In Rel-15/16 NR, when non-codebook-based transmission is used for the PUSCH, the UE may be configured with the SRS resource set having a maximum of four SRS resources with its usage being the non-codebook by RRC, and one or more of the maximum of four SRS resources may be indicated by DCI (the SRI field of 2 bits).

The UE may determine the number of layers (transmission rank) for the PUSCH, based on the SRI field. For example, the UE may determine that the number of SRS resources indicated by the SRI field is the same as the number of layers for the PUSCH. The UE may calculate the precoder of the SRS resources.

When the CSI-RS (which may be referred to as an associated CSI-RS) related to the SRS resources (or the SRS resource set to which the SRS resources belong) is configured in a higher layer, the transmit beam of the PUSCH may be calculated based on (measurement of) the related CSI-RS being configured. Otherwise, the transmit beam of the PUSCH may be indicated by the SRI.

Note that the UE may be configured with whether to use codebook-based PUSCH transmission or use non-codebook-based PUSCH transmission by a higher layer parameter "txConfig" indicating a transmission scheme. The parameter may indicate a value of "codebook" or "non-codebook (nonCodebook)".

In the present disclosure, the codebook-based PUSCH (codebook-based PUSCH transmission, codebook-based transmission, codebook-based UL transmission) may mean the PUSCH of a case in which the UE is configured with "codebook" as the transmission scheme. In the present disclosure, the non-codebook-based PUSCH (non-codebook-based PUSCH transmission, non-codebook-based transmission, non-codebook-based UL transmission) may mean the PUSCH of a case in which the UE is configured with "non-codebook" as the transmission scheme.

(High-Rank Transmission)

In Rel-15 NR, uplink (UL) Multi Input Multi Output (MIMO) transmission of up to four layers/ranks is supported. Regarding future NR, in order to implement higher spectral efficiency, supporting UL transmission of the number of layers being greater than 4 has been under study.

In a scenario (for example, indoors, in a dense urban area), high-rank transmission can achieve gains. In the following, "rank n-m Tx" indicates a case in which m transmission antennas are used and a maximum rank is limited to n. When rank 4-4 Tx, rank 4-8 Tx, rank 6-8 Tx, and rank 8-8 Tx are compared according to an evaluation in the above scenario, the highest performance can be achieved in the case of rank 6-8 Tx. In the cases of rank 6-8 Tx and rank 8-8 Tx, probability of scheduling for each number of layers (rank distribution, the number of layers to be scheduled, the number of layers to be adaptively controlled) is the highest when the number of layers is five and six. Even when the UE has eight transmission antennas, higher performance is observed when the maximum rank is limited (to rank 4 or 6, for example).

However, regarding UL transmission of a greater number of layers, full studies have not yet been carried out on how a network recognizes an antenna configuration of the UE and how the UE is made to perform the UL transmission. Unless this control is clarified, increase of communication throughput may be prevented.

In view of this, the inventors of the present invention came up with the idea of a method for appropriately performing UL transmission of a greater number of layers.

Embodiments according to the present disclosure will be described in detail with reference to the drawings as follows. The radio communication methods according to respective embodiments may each be employed individually, or may be employed in combination. Note that the embodiments of the present disclosure may be used when a UL TCI state is not introduced.

Note that, in the present disclosure, "A/B/ . . . /X" may mean "at least one of A, B, . . . , and X".

In the present disclosure, the higher layer signaling may be, for example, any one or combinations of Radio Resource Control (RRC) signaling, Medium Access Control (MAC) signaling, broadcast information, and the like. In the present disclosure, an RRC, RRC signaling, an RRC parameter, a higher layer parameter, an RRC information element (IE), an RRC message, and configuration may be interchangeably interpreted.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

In the present disclosure, activate, deactivate, indicate, select, configure, update, determine, and the like may be interchangeably interpreted.

In the present disclosure, a panel, a beam, a panel group, a beam group, an Uplink (UL) transmission entity, a TRP, spatial relation information (SRI), a spatial relation, a control resource set (CORESET), a Physical Downlink Shared Channel (PDSCH), a codeword, a base station, an antenna port (for example, a demodulation reference signal (DMRS) port), an port group (for example, a DMRS port group), a group (for example, a code division multiplexing (CDM) group, a reference signal group, or a CORESET group), a resource (for example, a reference signal resource), a resource set (for example, a reference signal resource set), a CORESET pool, a PUCCH group (PUCCH resource group), a spatial relation group, a downlink TCI state (DL TCI state), an uplink TCI state (UL TCI state), a unified TCI state, QCL, and the like may be interchangeably interpreted.

A spatial relation information Identifier (ID) (TCI state ID) and spatial relation information (TCI state) may be interchangeably interpreted. "Spatial relation information" may be interchangeably interpreted as a "set of spatial relation information", "one or multiple spatial relation information", and the like. A TCI state and a TCI may be interchangeably interpreted.

In the present disclosure, an index, an ID, an indicator, and a resource ID may be interchangeably interpreted. In the present disclosure, a sequence, a list, a set, a group, a cluster, a subset, and the like may be interchangeably interpreted.

In the present disclosure, limitation, an upper limit, limit, restriction, and a maximum number may be interchangeably interpreted.

In the present disclosure, a rank, the number of layers, the number of MIMO layers, the number of transmission layers, the number of spatial multiplexing, and the number of streams may be interchangeably interpreted.

In the following description of the embodiments, "spatial relation information (SRI)", "spatial relation information for the PUSCH", a "spatial relation", a "UL beam", a "transmit beam of the UE", a "UL TCI", a "UL TCI state", a "spatial relation of a UL TCI state", an SRS resource indicator (SRI), an SRS resource, a precoder, and the like may be interchangeably interpreted.

(Radio Communication Method)

For the UE having M antenna ports (transmission antennas), the maximum number of ranks/MIMO layers may be limited to N.

A combination of (M, N) supported by the UE may be reported as a UE capability. The combination of (M, N) or a value of N may be configured by higher layer signaling.

It is preferable that N be equal to or less than M in MIMO. However, the limitation of N being smaller than M (for example, N=4 or 6 for M=8) has at least one of the following benefits.

Larger performance gains.

Simpler specifications. For example, there is no need to define how to indicate/configure 5/6/7/8 layers for N=4 or 7/8 layers for N=6 in a case in which M=8.

Smaller DCI overhead. A necessary number (maximum number, number of bits, size) of the DCI field for the TPMI in codebook-based UL MIMO and a necessary number (maximum number, number of bits, size) of the SRI field for non-codebook-based UL MIMO can be reduced.

The limitation of the layers/ranks may follow one of the following two options 1 and 2.

[Option 1]

For given M, the value of N or the number of supported layers/ranks is defined by a specification. In the example of FIG. 1A, for the number M of transmission antennas=1, 1 is supported as the number of layers/ranks. For the number M of transmission antennas=2, 1 and 2 are supported as the number of layers/ranks. For the number M of transmission antennas=4, 1, 2, 3, and 4 are supported as the number of layers/ranks. For the number M of transmission antennas=8, 1, 2, 3, 4, 5, and 6 are supported as the number of layers/ranks.

[Option 2]

In a specification, no limitation of N (N being equal to M) may be supported. Higher layer signaling may limit the value of N. A (different) value of N may be configured for each number M of transmission antennas. In the example of FIG. 1B, for the number M of transmission antennas=1, the maximum number N of layers/ranks is not configured, and this means that N=M=1. For the number M of transmission antennas=2, the maximum number N of layers/ranks is not configured, and this means that N=M=2. For the number M of transmission antennas=4, the maximum number N of layers/ranks is not configured, and this means that N=M=4. For the number M of transmission antennas=8, the maximum number N of layers/ranks is configured to 6.

The UE may determine the number M of antenna ports and the number N of layers/ranks being smaller than M, and transmit the PUSCH using the N layers/ranks. When M is greater than a specific number, the number of layers/ranks may be limited to N. The specific number may be N, or may be a number greater than 4. N may be 6, or may be a number smaller than 8.

<<Transmission Antenna Use Methods>>

When N<M, the UE may use transmission antenna (s) in accordance with one of the following transmission antenna use methods 1 and 2.

[Transmission Antenna Use Method 1]

The UE uses all of M transmission antennas, but the maximum rank is limited to N. In the example of FIG. 2A, the number M of transmission antennas=8, all of the eight transmission antennas are used, and up to N=6 layers/ranks are used.

[Transmission Antenna Use Method 2]

The UE selects N transmission antennas among M transmission antennas and uses all of the N transmission antennas, and the maximum rank is N. In the example of FIG. 2B, the number M of transmission antennas=8, and the maximum rank N=6. All of N=6 transmission antennas are used, and up to 6 layers/ranks are used.

Based on reception results of the SRS/PUCCH/PUSCH in the network (for example, the base station), antenna selection may be performed by the network and indicated for the UE by DCI/MAC CE/RRC IE. For example, the indication may be a TPMI, an SRI, or a new DCI field for scheduling of the PUSCH.

Based on measurement of a DL RS/channel on each antenna port, antenna selection may be performed by the UE. For example, in the example of FIG. 2B, the UE may select six best (highest) transmission antennas having the largest (six highest) RSRP measurement values.

<<Transmission Antenna Indication Methods>>

When selection of transmission antenna port (s) to be used for PUSCH transmission is indicated based on transmission antenna use method 2, the UE may be indicated with transmission antenna (s) to be used in accordance with one of the following transmission antenna indication methods 1 to 3.

[Transmission Antenna Indication Method 1]

The indication may indicate whether or not to be used for each transmission antenna port. For example, the indication may be a bitmap. The bitmap may include M bits. The M bits may respectively correspond to M transmission antenna ports. A value of each bit may be 1 when a corresponding antenna port is used. Overhead of signaling is increased along with increase of the number of transmission antenna ports. The indication may be DCI/MAC CE/RRC IE.

[Transmission Antenna Indication Method 2]

Figures 3A, 3B:
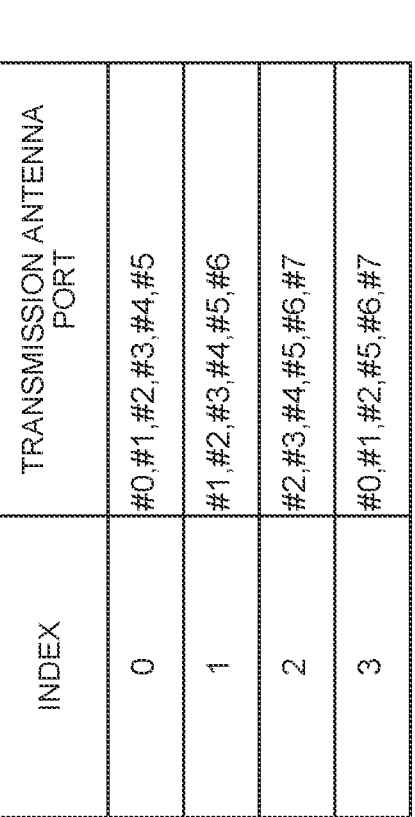
FIGS. 3A and 3B are diagrams to illustrate examples of transmission antenna indication methods.

A plurality of candidates for the transmission antenna ports may be indicated/configured by an RRC IE/MAC CE, and one of the plurality of candidates may be selected by DCI. In the example of FIG. 3A, indices are associated with combinations (a set, a group, a list) of the plurality of candidates for the transmission antenna ports. The plurality of candidates may be configured/indicated by an RRC IE/MAC CE. The relationship between the plurality of candidates and the indices may be defined in a specification, and the indices may be configured/indicated by an RRC IE/MAC CE.

[Transmission Antenna Indication Method 3]

The transmission antenna port of the PUSCH is associated with the transmission antenna port of the SRS. The UE transmits SRS resources in a plurality of time resources by using different combinations of transmission antenna ports. When the network schedules the PUSCH, the network indicates the antenna port of which SRS resource index is to be used for the PUSCH. A mechanism similar to that for the SRS having usage of beam management for a spatial relation indication of the PUSCH may be used.

In the example of FIG. 3B, SRSs #1 to #4 are respectively associated with a plurality of transmission antenna ports, and SRSs #1 to #4 are transmitted in different time resources. With the network indicating the SRS resource index (SRS #2) in scheduling of the PUSCH, the transmission antenna port of the indicated SRS resource is associated with the SRS. The UE uses a corresponding transmission antenna port for PUSCH transmission.

First Embodiment

A first embodiment relates to a transmission antenna configuration of the UE for supporting the number of layers being greater than 4.

<<UE Type/UE Capability>>

The UE may report UE capability information indicating support of transmission of the number of antenna ports being greater than 4 to the network. The UE capability information may be referred to as UE capability information related to a transmission antenna configuration. The UE capability information related to a transmission antenna configuration may include information related to the number of transmission antenna ports (for example, 6, 8, and the like) supported by the UE, or may include information related to the maximum number of layers for the codebook-based PUSCH/non-codebook-based PUSCH supported by the UE.

The information related to the maximum number of layers for the codebook-based PUSCH and the information related to the maximum number of layers for the non-codebook-based PUSCH may be respectively indicated by RRC parameters "maxNumberMIMO-LayersCB-PUSCH" and "maxNumberMIMO-LayersNonCB-PUSCH", for example. Note that any parameter name in the present disclosure may be provided with a suffix (for example, "r_18") or the like indicating a specific release.

The UE may report UE capability information related to antenna coherency to the network. The UE capability information related to antenna coherency may be included in the UE capability information related to a transmission antenna configuration, or may be included in other UE capability information. The UE capability information related to antenna coherency may be indicated by an RRC parameter "pusch-TransCoherence", for example.

The UE capability information related to antenna coherency may include information related to at least one of an antenna assumption and a codebook subset.

For example, the UE capability information related to antenna coherency may be indicated by "fully and partial and non-coherent (fullyAndPartialAndNonCoherent)", "partial and non-coherent (partialAndNonCoherent)", "non-coherent (NonCoherent)", and the like.

The UE capability information related to antenna coherency may indicate a set of coherent antennas, the number of ports included in the set, or the number of such sets. For example, the UE supporting transmission of six antenna ports may report "(X1, X2, X3)" as the UE capability information related to antenna coherency.

Here, Xi (i is an integer) indicates the number of antenna ports included in the set, which includes one or more coherent antenna ports. Xi may have a value from 0 to the maximum number of antenna ports. $\Sigma_i$Xi may correspond to the maximum number of antenna ports supported by the UE.

Xi (i is an integer) may indicate the number of ports included in one frame, and in this case, the UE capability information related to antenna coherency may indicate the number of ports included in each frame. Note that the frame is a unit in which the antenna ports are grouped/put into a set, and may be interpreted as a panel, a panel group, an antenna group, an antenna port group, an antenna port set, a beam group, or the like.

Figures 4A, 4B:
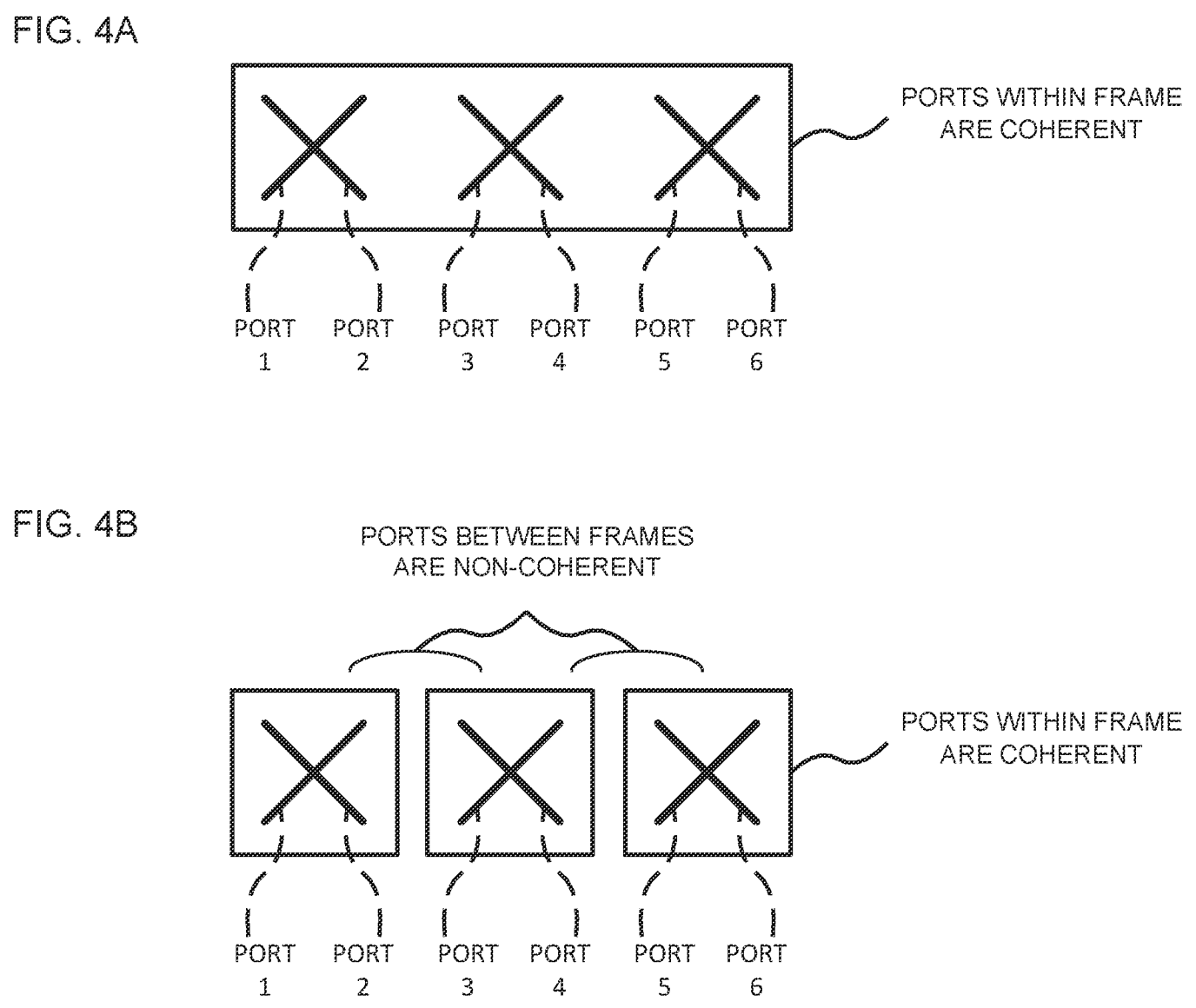

FIGS. 4A and 4B are diagrams to illustrate examples of the UE capability information related to antenna coherency according to the first embodiment. In the present example, a case in which the UE supports transmission of six antenna ports will be described.

FIG. 4A corresponds to a transmission antenna configuration in which all of the antenna ports are coherent within a frame. In FIG. 4A, all of six antenna ports (ports 1 to 6) are coherent, and thus the UE may report (X1, X2, X3)=(6, 0, 0).

FIG. 4B corresponds to a transmission antenna configuration in which a set of two antenna ports (combination of two antenna ports) within a frame is coherent, and there are three of such sets (frames). The antenna ports between different frames are non-coherent. In this case, the UE may report (X1, X2, X3)=(2, 2, 2).

The UE supporting transmission of eight antenna ports may report "(X1, X2, X3, X4)" as the UE capability information related to antenna coherency. When all of the eight antenna ports are coherent, the UE may report (X1, X2, X3, X4)=(8, 0, 0, 0).

(X1, X2, X3, X4)=(4, 4, 0, 0) may indicate a transmission antenna configuration in which a set of four antenna ports within a frame is coherent, the antenna ports between different frames are non-coherent, and there are two of such frames.

(X1, X2, X3, X4)=(2, 2, 2, 2) may indicate a transmission antenna configuration in which a set of two antenna ports within a frame is coherent, the antenna ports between different frames are non-coherent, and there are four of such frames.

Note that at least one of Xi to be reported may be omitted. For example, the UE having an antenna configuration of (X1, X2, X3, X4)=(2, 2, 2, 2) may report (X1, X2, X3)=(2, 2, 2) as the UE capability information related to antenna coherency. When the base station receiving the UE capability information understands that the UE supports eight antenna ports based on the UE capability information related to a transmission antenna configuration, for example, the base station may derive X4=8−(X1+X2+X3)=2. In this manner, when reporting of at least one Xi is omitted, increase of communication overhead of the UE capability information can be prevented.

Note that a sequence including Xi described above may be referred to as antenna coherency information, an antenna coherency type, or the like.

<<UE Operation>>

The UE supporting transmission of the number of antenna ports being greater than 4 may support the number of UL layers being greater than 4. For example, the UE supporting six transmission antenna ports (which may be referred to as a 6TX UE) may support up to a specific number (for example, 4/5/6) of layers for the UL. For example, the UE supporting eight transmission antenna ports (which may be referred to as an 8TX UE) may support up to a specific number (for example, 4/5/6/7/8) of layers for the UL.

The 6TX UE may use a table of a precoding matrix for transmission of a specific number (for example, 1/2/3/4/5/6) of layers using six antenna ports as a table of a precoding matrix when a transform precoder is disabled.

The 6TX UE may use a table of a precoding matrix for transmission of at least one layer using six antenna ports as a table of a precoding matrix when a transform precoder is enabled. The 6TX UE may use a table of a precoding matrix for transmission of two layers using six antenna ports as a table of a precoding matrix when a transform precoder is enabled.

The 8TX UE may use a table of a precoding matrix for transmission of a specific number (for example, 1/2/3/4/5/6/7/8) of layers using eight antenna ports as a table of a precoding matrix when a transform precoder is disabled.

The 8TX UE may use a table of a precoding matrix for transmission of at least one layer using eight antenna ports as a table of a precoding matrix when a transform precoder is enabled. The 8TX UE may use a table of a precoding matrix for transmission of two layers using eight antenna ports as a table of a precoding matrix when a transform precoder is enabled.

Note that the precoding matrix in the present disclosure may correspond to a TPMI index. The table of the precoding matrix (which may be referred to as a codebook) may be different for each antenna coherency type.

The UE (for example, the 6TX UE, the 8TX UE) supporting transmission of the number of antenna ports being greater than 4 may report the UE capability information indicating the maximum number of layers of UL transmission to be supported.

The UE may report the UE capability information indicating whether or not to support UL transmission of two layers when the transform precoder is enabled.

<<Number of Ranks/Layers for Codebook MIMO>>

For the UE supporting transmission using M transmission antenna ports, the maximum number N of ranks/layers in codebook MIMO (codebook-based UL transmission, codebook-based PUSCH) may follow one of the following limitation methods 1 and 2.

[Limitation Method 1]

The maximum number N of ranks/layers is defined in a specification.

[Limitation Method 2]

The maximum number of ranks/layers may not be defined in a specification, and that may mean a maximum of M ranks/layers. Higher layer signaling may configure limitation of the number of ranks/layers to N. N may be dependent upon reported UE capability signaling.

For the maximum number N of ranks/layers, a new precoding matrix table (a precoding matrix corresponding to the number of layers and a value of the TPMI index) for transmission of 1/2/ . . . /N layers using N or M antenna ports using transform precoding disabled may be defined in a specification.

For the maximum number N of ranks/layers, a new precoding matrix table (a precoding matrix corresponding to a value of the TPMI index) for transmission of at least one layer using N or M antenna ports using transform precoding enabled may be defined in a specification.

For the maximum number N of ranks/layers, a new precoding matrix table (a precoding matrix corresponding to a value of the TPMI index) for transmission of two layers using six antenna ports using transform precoding enabled may be defined in a specification.

According to the first embodiment described above, the transmission antenna configuration for the UE for supporting the number of layers being greater than 4 can be appropriately reported to the network.

In each of the following embodiments, the maximum number of ranks/layers may be limited to N. N may be configured by higher layer signaling, may be limited by a specification, or may be reported by a UE capability.

Second Embodiment

A second embodiment relates to PUSCH transmission of the UE (for example, the 6TX UE, the 8TX UE) supporting the number of layers being greater than 4.

The PUSCH with the number of layers being greater than 4 may be transmitted by a transport block (TB)/code word (CW). DCI (for example, DCI format 0_1/0_2) for scheduling the PUSCH may include at least one of the following fields having a size larger than a bit size of an existing DCI field:

an SRS resource indicator field, a precoding information field.

Note that a case in which the size of the SRS resource indicator field increases corresponds to a case of the non-codebook-based PUSCH, and the size need not increase in a case of the codebook-based PUSCH (that is, the size may be 1 bit). This is because, in a case of the codebook-based PUSCH with no increase of the number of SRS resources in the SRS resource set (for example, the number of SRS resources configured for the SRS resource set is 2), indication of one SRI for the PUSCH is sufficient and there is no need to increase the number of bits for the SRI.

Regarding the precoding information field, a new table for precoding and the number of layers for six/eight antenna ports may be defined. The table may be associated with the table of the precoding matrix.

Note that the size of an antenna port ('Antenna ports') field of the DCI need not increase. A new table for the antenna ports may be defined for a DMRS port indication of the number of layers being greater than 4. This will be described in a fourth embodiment.

The DCI may include two sets of fields, with each set including a modulation and coding scheme (MCS) field, a new data indicator (NDI) field, and a redundancy version (RV) field. One of the sets may correspond to one TB. In other words, with the DCI including these two sets, the UE may be scheduled with two TBs.

According to the second embodiment described above, PUSCH transmission using the number of layers being greater than 4 can be appropriately controlled.

Third Embodiment

A third embodiment relates to the SRS resource indicator field with the increased size described in the second embodiment.

The third embodiment is broadly classified into the following embodiments depending on how many SRS resources are configured for one SRS resource set for the UE for up to six or eight layers.

Embodiment 3.1: a case in which up to six or eight 1-port SRS resources are configured for one SRS resource set, Embodiment 3.2: a case in which up to three or four 1-port SRS resources are configured for one SRS resource set.

Note that, as described above, the SRS resource set in the third embodiment may be an SRS resource set having usage of the non-codebook, and the PUSCH may be the non-codebook-based PUSCH.

Embodiment 3.1

After SRS transmission is performed by the UE, the base station may indicate up to six or eight SRS resources for the UE, using DCI. The size of the SRS resource indicator field included in the DCI may be expressed by the following expression 1.

[Math. 1]

$$\left\lceil \log_2 \left( \sum_{k=1}^{min\{L_{max},N_{SRS}\}} \binom{N_{SRS}}{k} \right) \right\rceil \qquad \text{(Expression 1)}$$

Here, $N_{SRS}$ represents the number of SRS resources configured for the SRS resource set having usage of the non-codebook, and $L_{max}$ may be given by a higher layer parameter (for example, an RRC parameter "maxMIMO-Layers") indicating maximum MIMO layers used for the PUSCH, or may be given by a maximum number of layers for the PUSCH supported by the UE for non-codebook-based operation.

Expression 1 itself is the same in Rel-15 NR as well. In Rel-15 NR, $N_{SRS}$, $L_{max}$, and the like are each a value equal to or less than 4, whereas in a case of Embodiment 3.1, $N_{SRS}$, $L_{max}$, and the like may each be 6 or 8, and thus the size of the SRS resource indicator field is increased in comparison to that of Rel-15 NR.

Embodiment 3.2

In Embodiment 3.2, the UE may be configured with two SRS resource sets, and each of the SRS resource sets may include up to three or four 1-port SRS resources.

In Embodiment 3.2, the UE may receive DCI including two SRS resource indicator fields. When the UE is configured with "two SRS resources regarding the non-codebook base", the UE may assume that the DCI includes two SRS resource indicator fields.

After SRS transmission is performed by the UE, the base station may indicate up to three of four SRS resources for each SRS resource indicator field in the DCI for the UE. One SRS resource indicator field may correspond to one TB.

Regarding PUSCH transmission of equal to or less than a specific number (for example, 4) of layers, one SRS resource indicator field may indicate up to four SRS resources, and the other SRS resource indicator field may indicate no SRS resources.

Regarding PUSCH transmission of the number of layers being greater than the specific number (for example, 4) of layers, the SRS resources indicated by each SRS resource indicator field may be subjected to a limitation. For example, the number of SRS resources that may be indicated by two SRS resource indicator fields may be at least one of (3+2), (2+3), (3+3), (3+4), (4+3), (4+4), and the like.

Note that, in the present disclosure, the expression of X+Y layers (X and Y are each a number) may mean transmission of X+Y layers based on an indication of X+Y SRS resources using the two SRS resource indicator fields described in Embodiment 3.2.

According to the third embodiment described above, the SRI can be appropriately indicated regarding the non-codebook-based PUSCH using the number of layers being greater than 4.

Fourth Embodiment

A fourth embodiment relates to a table of antenna ports for a DMRS port indication of the number of layers being greater than 4 when the transform precoder is disabled.

Regarding the codebook-based PUSCH, the UE determines a rank (number of layers) for PUSCH transmission, based on the precoding information field of the DCI. Regarding the non-codebook-based PUSCH, the UE determines a rank (number of layers) for PUSCH transmission, based on the SRS resource indicator field of the DCI.

Then, the UE may determine a table of antenna ports corresponding to the determined rank, based on enabled/disabled of the transform precoder, a DMRS type (which may be configured by an RRC parameter "dmrs-Type") of the PUSCH configured by higher layer signaling, and a value of a DMRS maximum length (which may be configured by an RRC parameter "maxLength").

Depending on a value of the antenna port field of the DCI, entries (the entries correspond to a set of the number of CDM groups, an antenna port index of the DMRS, the number of front-load symbols ("Number of front-load symbols"), and the like) of the table to be referred to may be determined.

Case in Which DMRS Type=1 and DMRS Maximum Length=1

In a case in which DMRS type=1 and DMRS maximum length=1, transmission of up to rank 4 may be supported. In other words, the UE configured with DMRS type=1 and DMRS maximum length=1 does not support transmission of greater than rank 4.

[Case in Which DMRS Type=1 and DMRS Maximum Length=2]

In a case in which DMRS type=1 and DMRS maximum length=2, transmission of up to rank 8 may be supported.

FIGS. 5A to 5D are diagrams to illustrate examples of tables of antenna ports to be referred to in a case in which the transform precoder is disabled, DMRS type=1, and DMRS maximum length=2 according to the fourth embodiment.

FIG. 5A is an example of a table of antenna ports corresponding to rank 5. In the present example, different sets of DMRS ports (the number of antenna ports is five) are associated with antenna port field value=0 to 3. Note that correspondence between the values and details of the entries is not limited to this. The same holds true for other examples.

In FIG. 5A, 2+3 layers and 3+2 layers may be supported. Note that only a part of the illustrated entries may be supported. For example, only the entries of DMRS ports 0 to 4 may be supported for 2+3 layers, and only the entries of DMRS ports 0, 1, 2, 3, and 6 may be supported for 3+2 layers.

FIG. 5B is an example of a table of antenna ports corresponding to rank 6. In the present example, different sets of DMRS ports (the number of antenna ports is 6) are associated with antenna port field value=0 to 2.

In FIG. 5B, 4+2 layers, 2+4 layers, and 3+3 layers may be supported. Note that only a specific combination (for example, 3+3) of X and Y regarding the X+Y layers may be supported.

FIG. 5C is an example of a table of antenna ports corresponding to rank 7. In the present example, different sets of DMRS ports (the number of antenna ports is 7) are associated with antenna port field value=0 to 1.

In FIG. 5C, 4+3 layers and 3+4 layers may be supported.

FIG. 5D is an example of a table of antenna ports corresponding to rank 8. In the present example, a set of DMRS ports (the number of antenna ports is 8) is associated with antenna port field value=0.

In FIG. 5D, only 4+4 layers may be supported.

[Case in Which DMRS Type=2 and DMRS Maximum Length=1]

In a case in which DMRS type=2 and DMRS maximum length=1, transmission of up to rank 6 may be supported, only transmission of up to rank 4 may be supported, or only transmission of up to rank 5 may be supported without transmission of rank 6 (for example, 4+2 layers) being supported.

FIGS. 6A and 6B are diagrams to illustrate examples of tables of antenna ports to be referred to in a case in which the transform precoder is disabled, DMRS type=2, and DMRS maximum length=1 according to the fourth embodiment.

FIG. 6A is an example of a table of antenna ports corresponding to rank 5. In the present example, a set of DMRS ports (the number of antenna ports is 5) is associated with antenna port field value=0.

FIG. 6B is an example of a table of antenna ports corresponding to rank 6. In the present example, a set of DMRS ports (the number of antenna ports is 6) is associated with antenna port field value=0.

[Case in Which DMRS Type=2 and DMRS Maximum Length=2]

In a case in which DMRS type=2 and DMRS maximum length=2, transmission of up to rank 8 may be supported.

FIGS. 7A to 7D are diagrams to illustrate examples of tables of antenna ports to be referred to in a case in which the transform precoder is disabled, DMRS type=2, and DMRS maximum length=2 according to the fourth embodiment.

FIG. 7A is an example of a table of antenna ports corresponding to rank 5. In the present example, different sets of DMRS ports (the number of antenna ports is 5) are associated with antenna port field value=0 to 2.

FIG. 7B is an example of a table of antenna ports corresponding to rank 6. In the present example, different sets of DMRS ports (the number of antenna ports is 6) are associated with antenna port field value=0 to 3.

In FIG. 7B, 4+2 layers, 2+4 layers, and 3+3 layers may be supported. Note that only a specific combination (for example, 3+3) of X and Y regarding the X+Y layers may be supported. For example, only the entries corresponding to antenna port field value=3 of FIG. 7B may be supported for 3+3.

FIG. 7C is an example of a table of antenna ports corresponding to rank 7. In the present example, different sets of DMRS ports (the number of antenna ports is 7) are associated with antenna port field value=0 to 3.

FIG. 7D is an example of a table of antenna ports corresponding to rank 8. In the present example, sets of DMRS ports (the number of antenna ports is 8) are associated with antenna port field value=0 to 2.

Regarding FIG. 7D, only the entries corresponding to 4+4 layers may be supported.

According to the fourth embodiment described above, the antenna ports can be appropriately indicated regarding the PUSCH using the number of layers being greater than 4 when the transform precoder is disabled.

OTHER EMBODIMENTS

A higher layer parameter (RRC information element)/UE capability corresponding to at least one function (characteristic, feature) in each embodiment may be defined. The UE capability may indicate whether or not to support the function.

The UE configured with the higher layer parameter corresponding to the function may perform the function. "The UE not configured with the higher layer parameter corresponding to the function does not perform the function (applies operations of Rel. 15/16, for example)" may be defined.

The UE that has reported the UE capability indicating support of the function may perform the function. "The UE that does not report the UE capability indicating support of the function does not perform the function (applies operations of Rel. 15/16, for example)" may be defined.

When the UE reports the UE capability indicating support of the function, and is configured with the higher layer parameter corresponding to the function, the UE may perform the function. "When the UE does not report the UE capability indicating support of the function, or is not configured with the higher layer parameter corresponding to the function, the UE does not perform the function (applies operations of Rel. 15/16, for example)" may be defined.

The UE capability may indicate at least one of the following.

Information related to at least one of M and N. For example, up to how many transmission antenna ports the UE supports (a maximum number M of transmission antenna ports). For example, up to how many ranks/layers the UE supports (a maximum number M of ranks/layers). M and N may be jointly reported. For example, a combination of M and N may be reported. The information related to at least one of M and N may be separately reported for the codebook-based UL transmission and the non-codebook-based UL transmission, or may be jointly reported for the codebook-based UL transmission and the non-codebook-based UL transmission.

Whether or not a new TPMI table for codebook MIMO is supported.

Up to how many SRS resources/SRS resource sets whose usage has usage of the codebook/non-codebook the UE supports (a maximum number of SRS resources/SRS resource sets whose usage has usage of the codebook/non-codebook).

According to the UE capability/higher layer parameter described above, the UE can implement the above function while maintaining compatibility with existing specifications.
(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
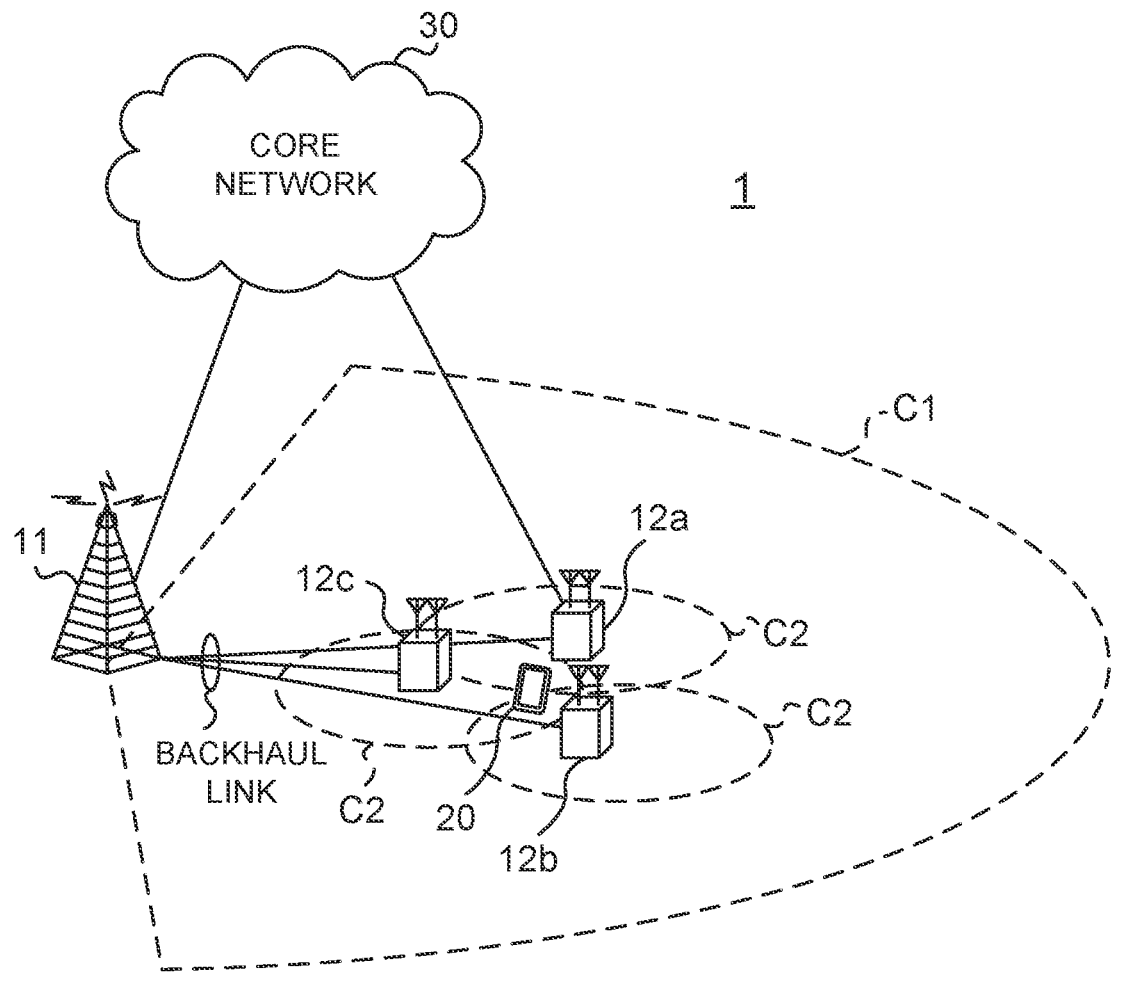
FIG. 8 is a diagram to illustrate an example of a schematic structure of a radio communication system according to one embodiment.

FIG. 8 is a diagram to illustrate an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect illustrated in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved 17 18

Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
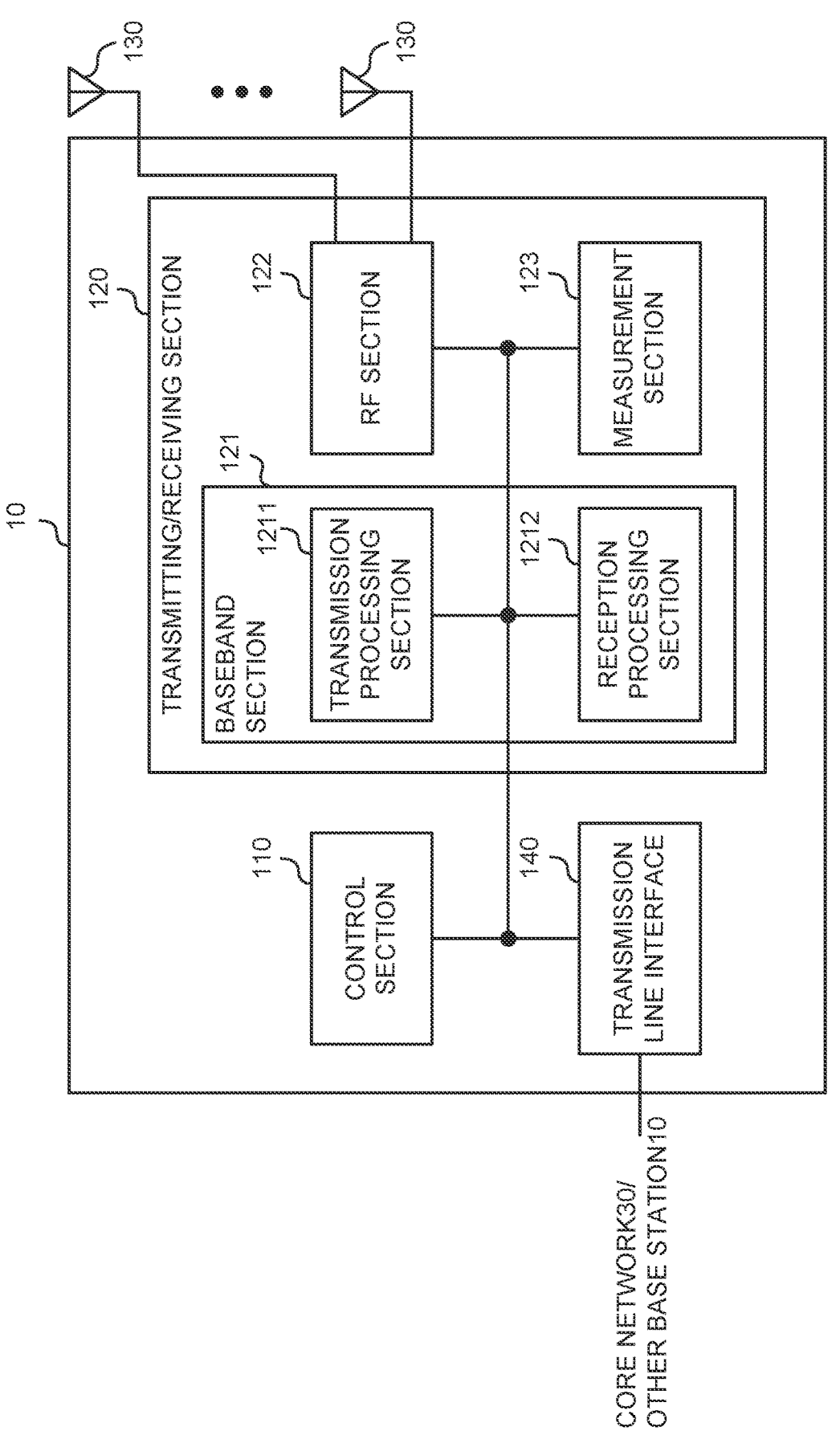
FIG. 9 is a diagram to illustrate an example of a structure of a base station according to one embodiment.

FIG. 9 is a diagram to illustrate an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily illustrates functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing, filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The control section 110 may determine a number M of antenna ports and a number N of layers being smaller than M. The transmitting/receiving section 120 may receive a physical uplink shared channel that uses N layers.

(User Terminal)

Figure 10:
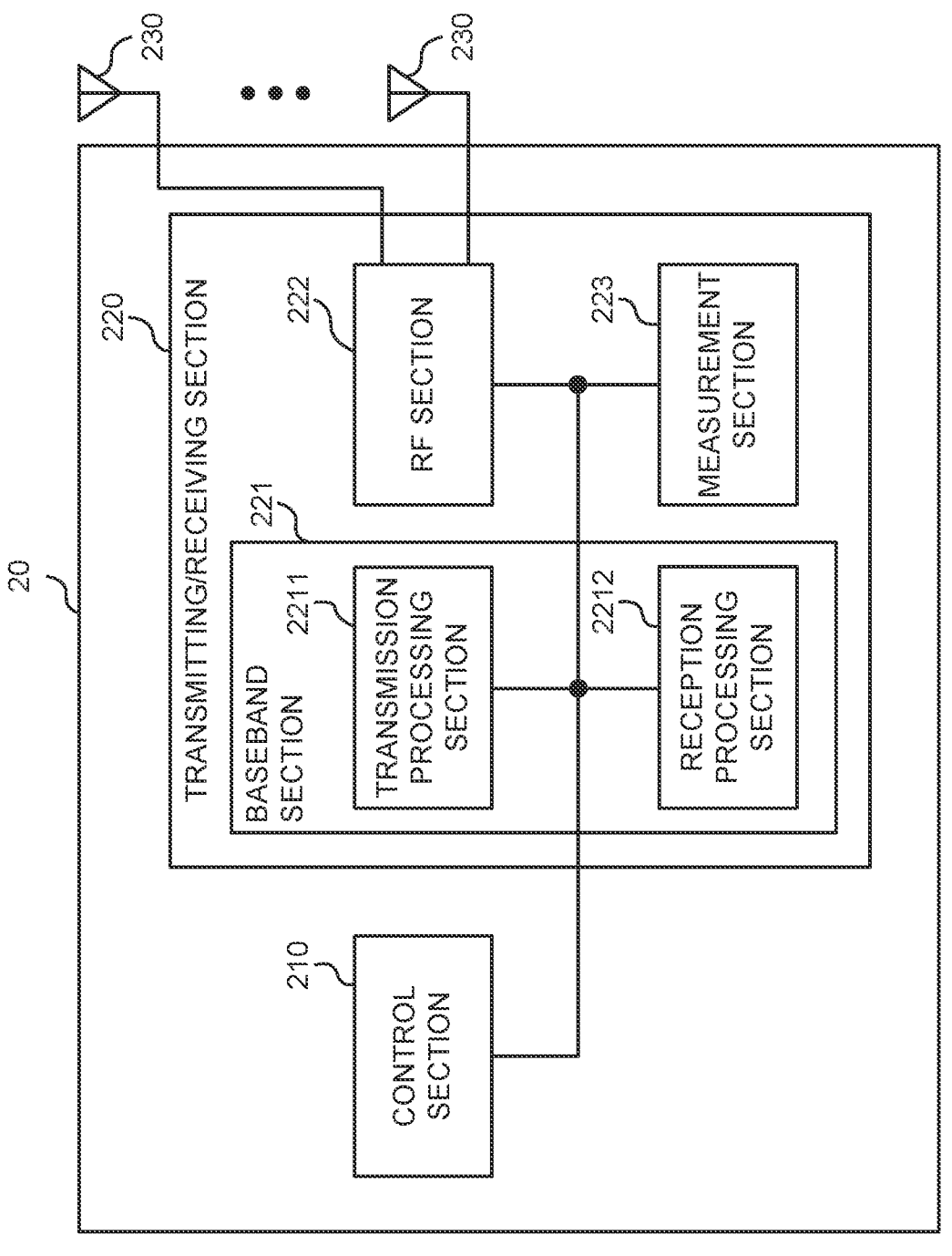
FIG. 10 is a diagram to illustrate an example of a structure of a user terminal according to one embodiment.

FIG. 10 is a diagram to illustrate an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily illustrates functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoder (precoding). The transmitting/receiving section 220 (transmission processing section 2211) may perform, for a channel (for example, PUSCH), the DFT processing as the above-described transmission processing to transmit the channel by using a DFT-s-OFDM waveform if the transform precoder is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine a number M of antenna ports and a number N of layers being smaller than M. The transmitting/receiving section 220 may transmit a physical uplink shared channel by using N layers.

The control section 210 may report capability information related to a combination of M and N.

The control section 210 may control reception of indication information related to a combination of M and N or N, and determine M and N, based on the indication information.

The control section 210 may determine N antenna ports, based on one of information related to N antenna port numbers among M antenna ports and information related to a sounding reference signal resource associated with the N antenna ports. The transmitting/receiving section 220 may transmit the physical uplink shared channel by using the N antenna ports and the N layers.

(Hardware Structure)

Note that the block diagrams that have been used to describe the above embodiments illustrate blocks in functional units. These functional blocks (components) may be implemented in arbitrary combinations of at least one of hardware and software. Also, the method for implementing each functional block is not particularly limited. That is, each functional block may be realized by a single apparatus that is physically or logically coupled, or may be realized by directly or indirectly connecting two or more physically or logically separate apparatus (for example, via wire, wireless, or the like) and using these apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
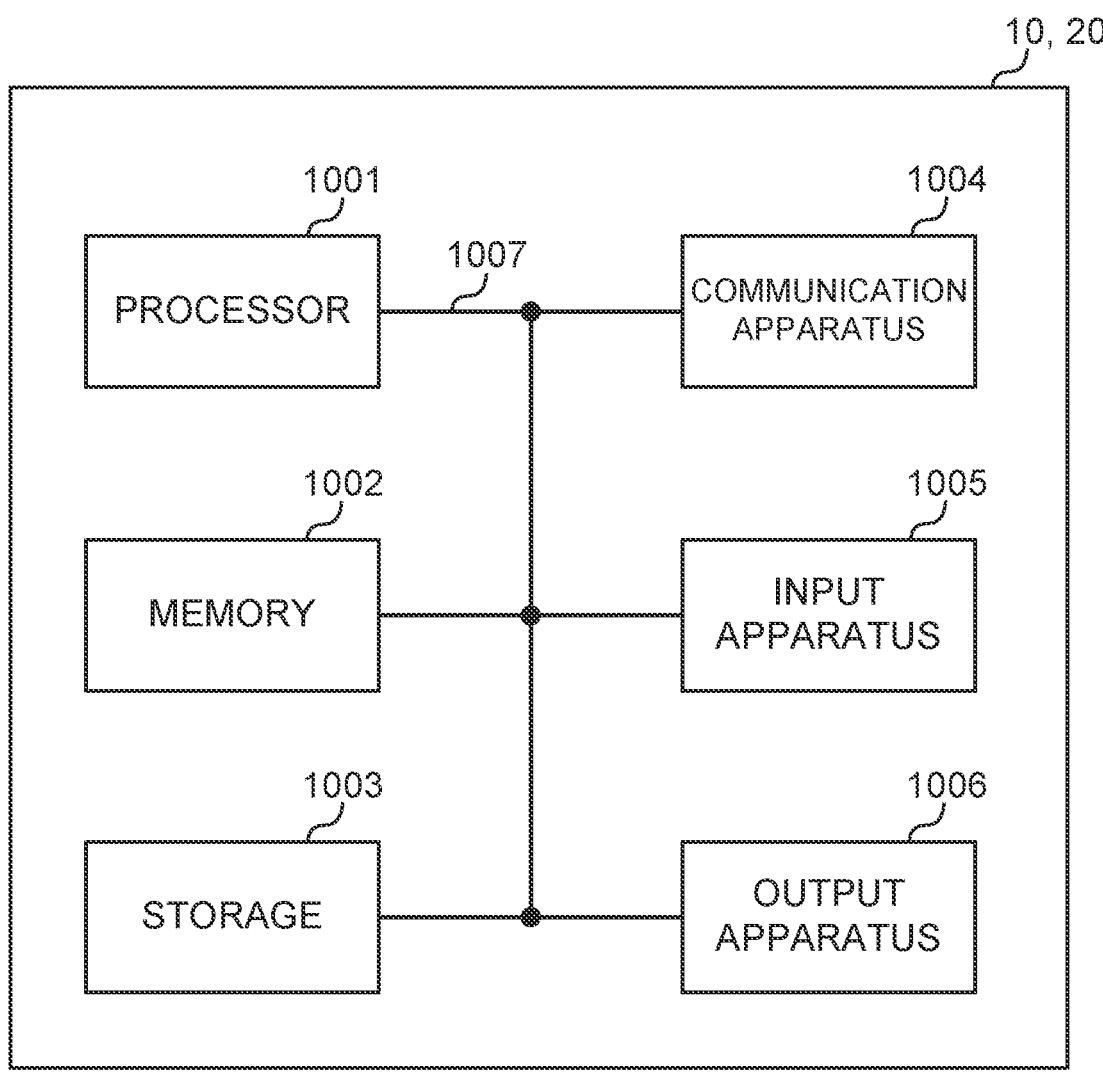
FIG. 11 is a diagram to illustrate an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to illustrate an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses illustrated in the drawings, or may be configured not to include part of apparatuses.

For example, although only one processor 1001 is illustrated, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between multiple apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting the given information or reporting another information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
   a transmitter that reports capability information indicating support of transmission of a number of antenna ports being greater than 4;

a receiver that receives higher layer signaling indicating a maximum number of a rank for transmitting a physical uplink shared channel (PUSCH), the maximum number of the rank being greater than 4; and a processor that controls transmission of the PUSCH, based on a number M of antenna ports and a number N of layers, wherein the number N of layers is greater than 4 and the number M of antenna ports is greater than the number N of layers, wherein the number N of layers is based on the capability information indicating support of transmission of a number of antenna ports being greater than 4 and based on the higher layer signaling indicating the maximum number of the rank for transmitting the PUSCH, wherein when a transform precoder is disabled, a demodulation reference signal (DMRS) port is determined based on a DMRS type, a DMRS maximum length, and a transmission rank for the PUSCH, and wherein the transmission rank is greater than 4.

2. The terminal according to claim 1, wherein downlink control information scheduling the PUSCH includes a modulation and coding scheme (MCS) field for two transport blocks (TBs), a new data indicator (NDI) field, and a redundancy version (RV) field.

3. A radio communication method for a terminal, comprising:

reporting capability information indicating support of transmission of a number of antenna ports being greater than 4;

receiving higher layer signaling indicating a maximum number of a rank for transmitting a physical uplink shared channel (PUSCH), the maximum number of the rank being greater than 4; and controlling transmission of the PUSCH, based on a number M of antenna ports and a number N of layers, wherein the number N of layers is greater than 4 and the number M of antenna ports is greater than the number N of layers, wherein the number N of layers is based on the capability information indicating support of transmission of a number of antenna ports being greater than 4 and based on the higher layer signaling indicating the maximum number of the rank for transmitting the PUSCH, wherein when a transform precoder is disabled, a demodulation reference signal (DMRS) port is determined based on a DMRS type, a DMRS maximum length, and a transmission rank for the PUSCH, and wherein the transmission rank is greater than 4.

4. A base station comprising:

a receiver that receives capability information indicating support of transmission of a number of antenna ports being greater than 4;

a transmitter that transmits higher layer signaling indicating a maximum number of a rank for transmitting a physical uplink shared channel (PUSCH), the maximum number of the rank being greater than 4; and a processor that controls reception of the PUSCH, based on a number M of antenna ports and a number N of layers, wherein the number N of layers is greater than 4 and the number M of antenna ports is greater than the number N of layers, wherein the number N of layers is based on the capability information indicating support of transmission of a number of antenna ports being greater than 4 and based on the higher layer signaling indicating the maximum number of the rank for transmitting the PUSCH, wherein when a transform precoder is disabled, a demodulation reference signal (DMRS) port is determined based on a DMRS type, a DMRS maximum length, and a transmission rank for the PUSCH, and wherein the transmission rank is greater than 4.

5. A system comprising a terminal and a base station, wherein the terminal comprises:

a transmitter that reports capability information indicating support of transmission of a number of antenna ports being greater than 4;

a receiver that receives higher layer signaling indicating a maximum number of a rank for transmitting a physical uplink shared channel (PUSCH), the maximum number of the rank being greater than 4; and a processor that controls transmission of the PUSCH, based on a number M of antenna ports and a number N of layers, wherein the number N of layers is greater than 4 and the number M of antenna ports is greater than the number N of layers, wherein the number N of layers is based on the capability information indicating support of transmission of a number of antenna ports being greater than 4 and based on the higher layer signaling indicating the maximum number of the rank for transmitting the PUSCH, wherein when a transform precoder is disabled, a demodulation reference signal (DMRS) port is determined based on a DMRS type, a DMRS maximum length, and a transmission rank for the PUSCH, wherein the transmission rank is greater than 4, and the base station comprises:

a transmitter that transmits the higher layer signaling.

* * * * *